Patented Feb. 16, 1937

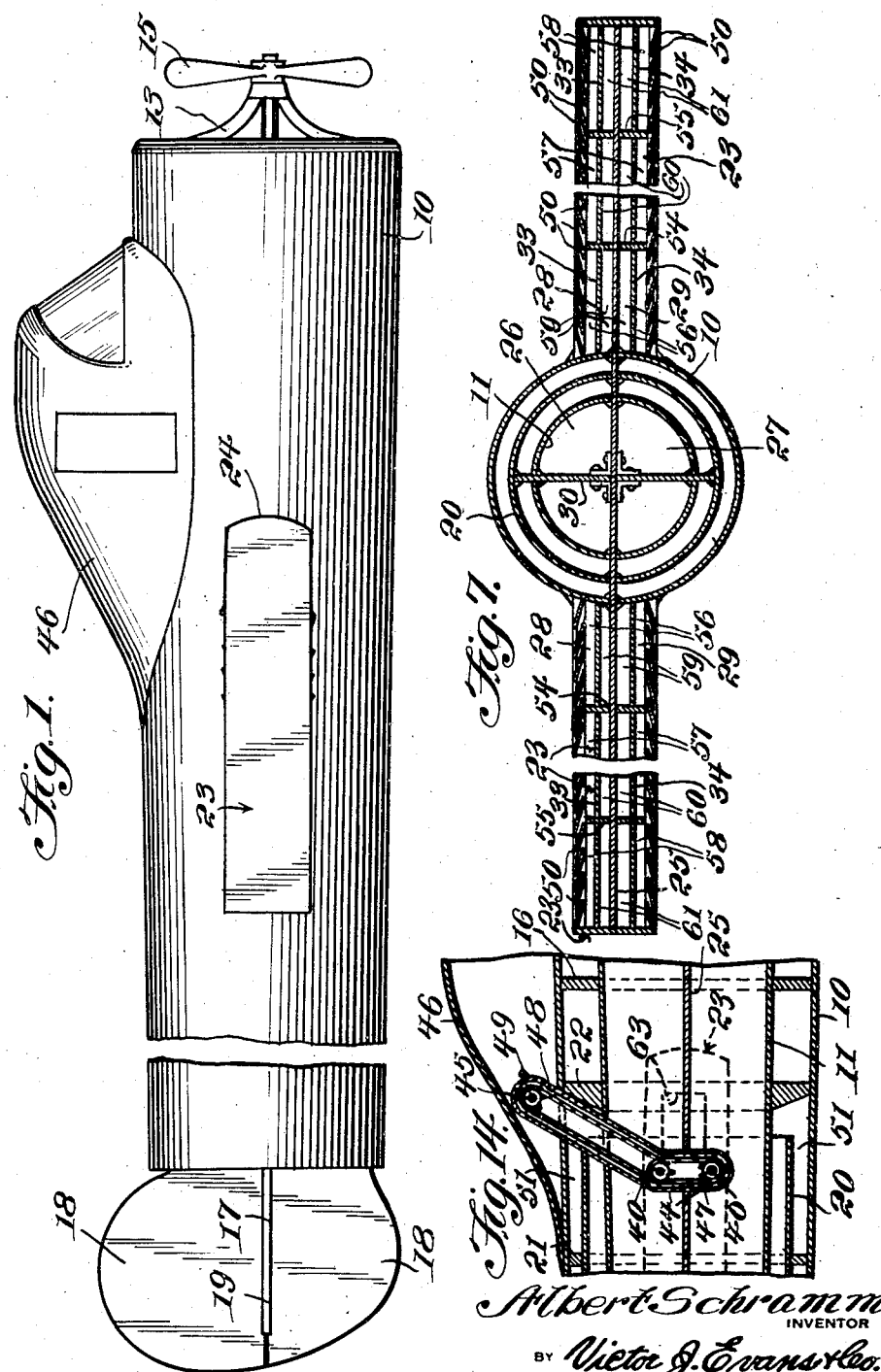

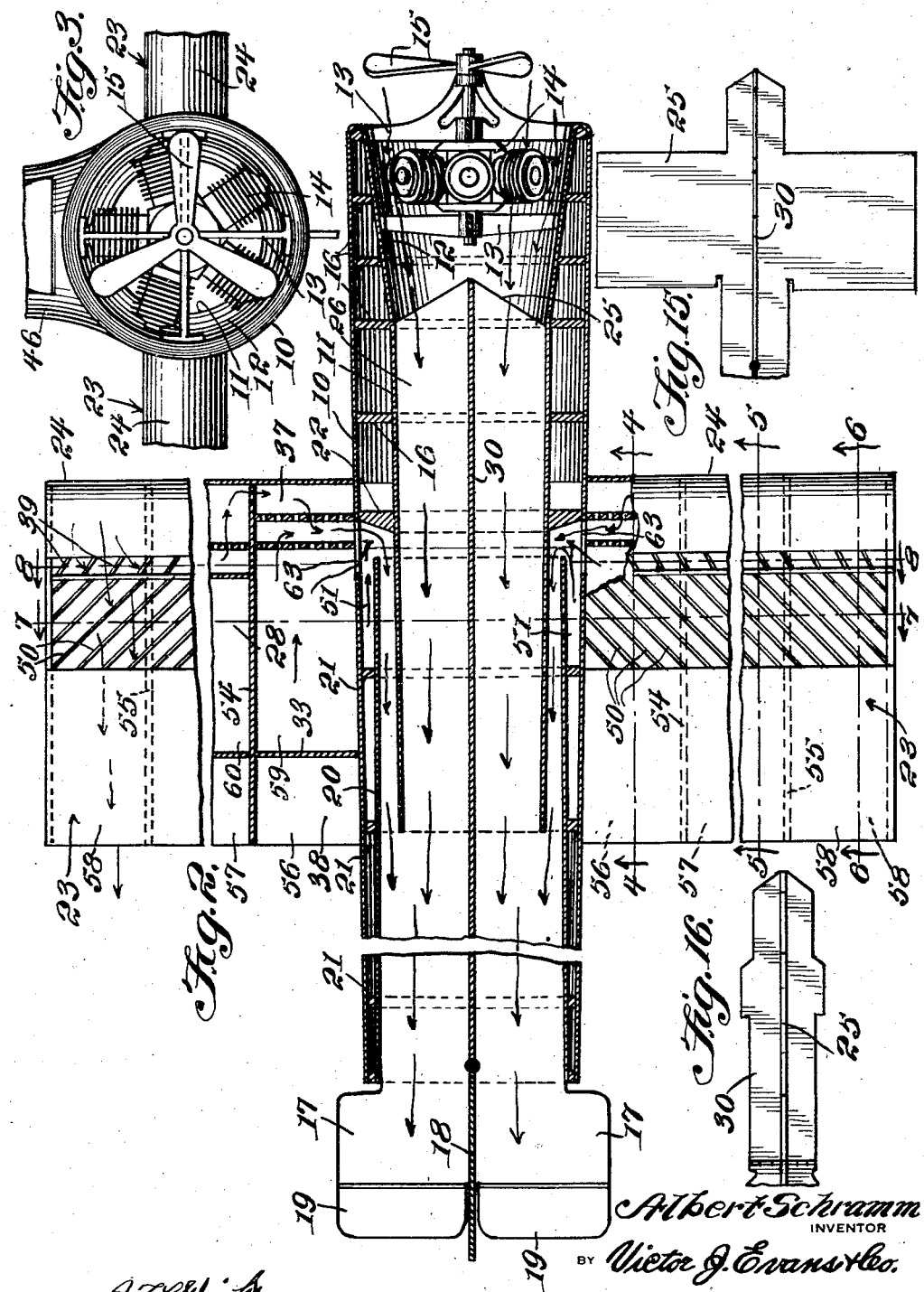

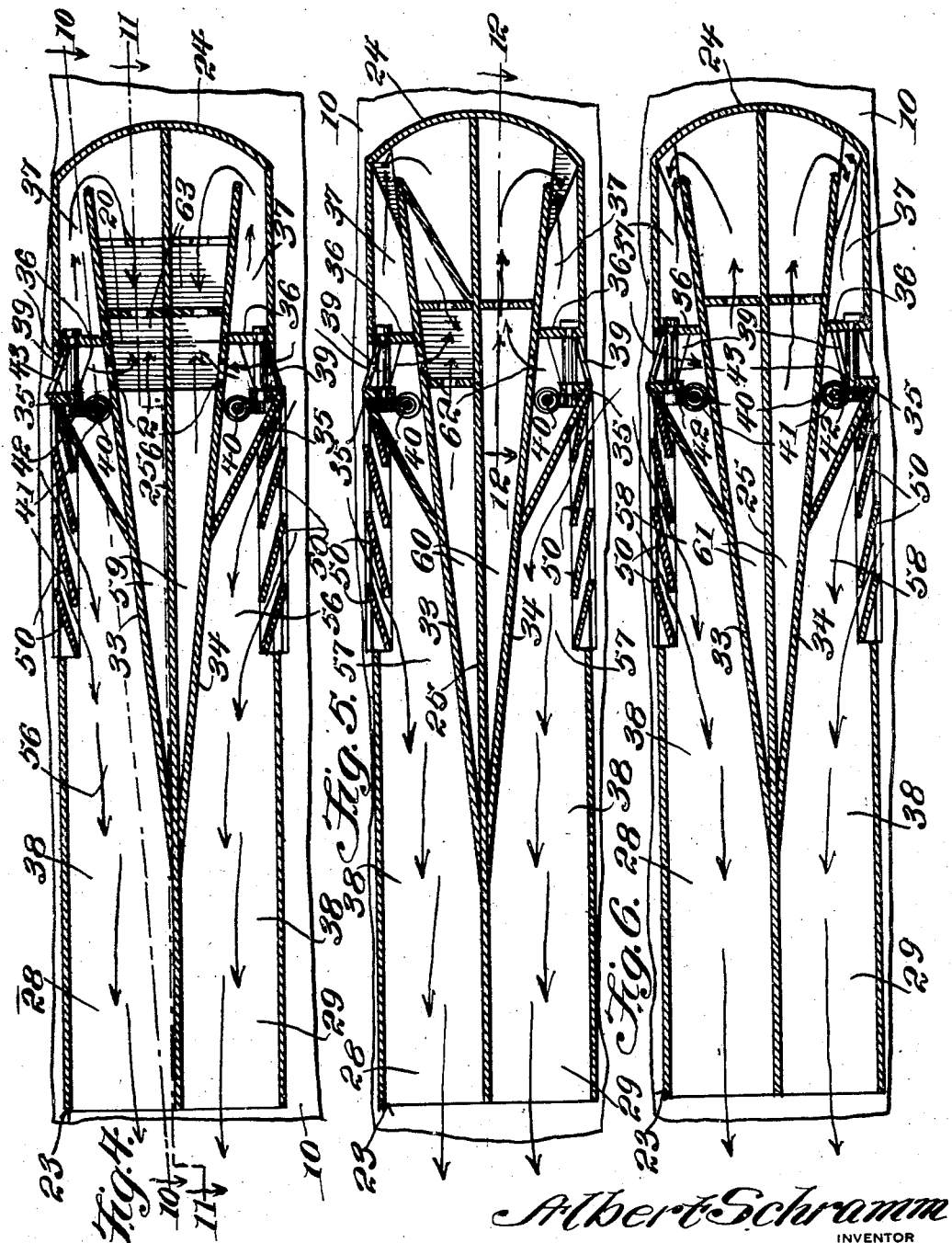

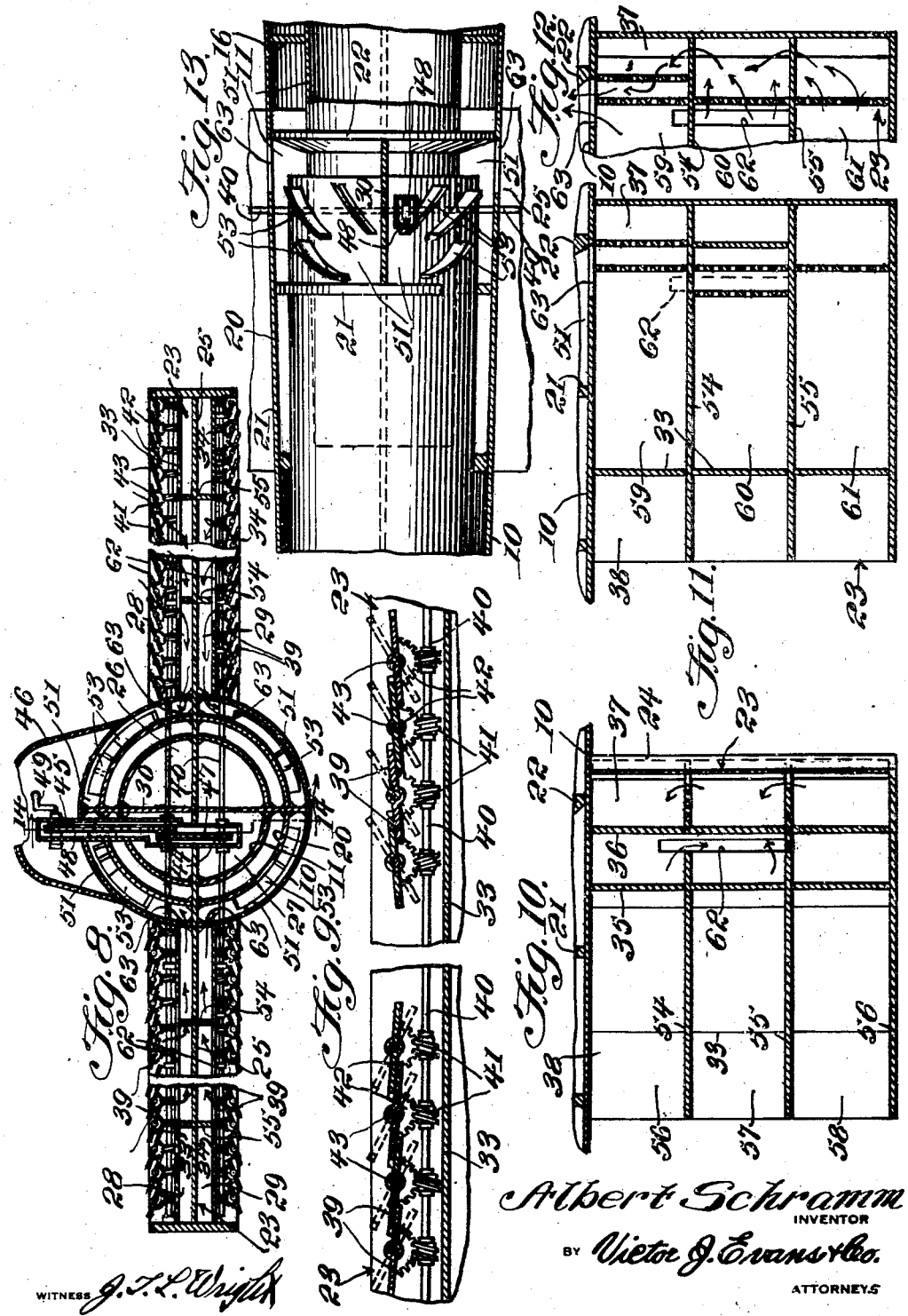

2,071,221

UNITED STATES PATENT OFFICE 2,071,221

AIRPLANE

Albert Schramm, Astoria, N. Y.

Application August 6, 1935, Serial No. 34,961

3 Claims. (Cl. 244—73)

This invention relates to airplanes and has for an object to provide novel means for utilizing the air stream from the propeller to evacuate forward compartments in hollow wings and thus by drawing the air from the leading edges of the wings into the wings and expelling it from the fuselage the tendency of the air to bank up or be pushed ahead of the leading edges of the wings in the nature of a bow wave of a ship, will be eliminated.

A further object of the invention is to provide an airplane having hollow wings provided with upper and lower compartments which are open at the rear ends to the atmosphere and at the front ends are provided with louvres which are set at an angle of incidence and due to pressure upon them of air entering the wing and passing out therefrom, greater speed will be imparted to the wing structure, than hitherto possible.

A further object of the invention is to provide an airplane having independent conduits or compartments in both the fuselage and the wings forming separate passage-ways for the various streams of air so that eddies will be prevented and interference between air currents induced in the various passages, which might tend to disrupt the balance or stability of the airplane, will be prevented.

A further object is to provide an airplane having the rudders and stabilizers within the outlines of the tubular fuselage so as to be acted upon directly by the air jet from the wind tunnel to promote easier steering and without disturbing the air outside of the slip stream from the fuselage.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of my improved airplane.

Figure 2 is a longitudinal sectional view of an airplane constructed in accordance with the invention, with parts in elevation.

Figure 3 is a fragmentary front elevation of the airplane.

Figure 4 is a cross section of the hollow wing structure taken on the line 4—4 of Figure 2.

Figure 5 is a cross section of the wing structure taken on the line 5—5 of Figure 2.

Figure 6 is a cross section of the wing structure taken on the line 6—6 of Figure 2.

Figure 7 is a cross sectional view of the airplane taken on the line 7—7 of Figure 2.

Figure 8 is a cross section of the airplane taken on the line 8—8 of Figure 2.

Figure 9 is a fragmentary detail section showing the worm and segment gear mechanism for adjusting the vanes.

Figure 10 is a fragmentary longitudinal section of the wing taken on the line 10—10 of Figure 4.

Figure 11 is a fragmentary longitudinal section of the wing taken on the line 11—11 of Figure 4.

Figure 12 is a fragmentary longitudinal section of the wing taken on the line 12—12 of Figure 5.

Figure 13 is a detail view showing the baffles for deflecting air current from the wings into the hollow fuselage.

Figure 14 is a detail longitudinal section showing the manually operable sprocket chain for actuating the adjusting shafts of the vanes.

Figure 15 is a plan view of the cruciform diaphragm forming division walls in the fuselage and wings.

Figure 16 is a side elevation of the diaphragm shown in Figure 15.

Referring now to the drawings in which like characters of reference designate similar parts in the various views, 10 designates a tubular fuselage having axially located therein a wind tunnel 11 the front end of which is flared as shown at 12 and carries the mountings 13 for a motor 14 of the radial type and a propeller 15 as best shown in Figure 2. The wind tunnel is braced at intervals by annular ribs 16 interposed between the fuselage and the wind tunnel. The fuselage is tapered slightly from front to rear and is open at both the front and rear ends so that the air stream from the propeller passes through the wind tunnel and jets out of the open rear end of the fuselage.

The tail structure including stabilizers 17, vertical rudders 18 and elevator flaps 19, is attached to the fuselage in any preferred manner and lies substantially entirely within the circumferential outline of the fuselage so as to be effected by the air blast from the wind tunnel to promote easy steering. At the same time the air outside the slip stream from the fuselage is undisturbed since virtually no part of the tail structure extends outwardly beyond the circumferential outline of the fuselage.

The fuselage is double walled as shown at 20 from a point substantially midway of the wind tunnel to the open rear end of the fuselage an the inner tubular wall 20 is braced at intervals by annular ribs 21. The front end of the inner wall terminates short of a baffle wall 22 which provides passageways from the wings to the space between the inner wall 20 and the wind tunnel 11. The wind tunnel thus constitutes a Venturi tube to evacuate the wings 23. The wings are hollow and the rear end of each wing is open to the atmosphere while the front end is rounded in the arc of a circle to provide a blunt leading edge or nose 24.

A substantially cruciform diaphragm 25, best shown in Figures 15 and 16, is mounted midway in the wind tunnel, fuselage, and wings to provide upper and lower compartments 26 and 27 in the wind tunnel and fuselage and upper and lower compartments 28 and 29 in each wing. The diaphragm is provided with a vertical extension 30 which extends longitudinally of the diaphragm and divides the wind tunnel and fuselage into segment shaped compartments. The purpose of these separate compartments in the wing structure, fuselage and wind tunnel is to prevent any tendency of eddying currents and also to maintain the various air streams hereinafter described separated so that interference between air currents induced in the various passages will be eliminated and thus the balance and stability of the airplane be greatly promoted.

By referring to Figures 4, 5 and 6 it will be seen that each hollow wing is provided with division walls 33 and 34 which extend the entire length of the wing and are disposed obliquely to the diaphragm 25, these division walls merging with the diaphragm near the rear open end of the wing and diverging from the diaphragm forwardly to a point adjacent to the rounded nose 24 of the wing. Baffle walls 35 and 36 are interposed in spaced relationship between the outer wall of the wing and the inclined division walls to divide the wing into a forward compartment 37 and a rear compartment 38 above and below the diaphragm. In the space between the baffle walls 35 and 36 a plurality of shutters 39 are disposed and these shutters are adjustable as will hereinafter be described to permit communication between the forward compartments 37 of the wing and the atmosphere, for the purpose of withdrawing the banked up air from in front of the rounded nose 24 in flight, into the wing from whence it is sucked into the fuselage by the velocity of the jet from the Venturi tube or wind tunnel and expelled through the rear open end of the fuselage. Consequently there may be said to be a low pressure area created ahead of the leading edge or rounded nose of each wing to promote greater speed with less fuel consumption than hitherto possible. The edges of the shutters are flush with the surface of the wing when the shutters are open.

For operating the shutters or vanes a pair of shafts 40, best shown in Figures 8 and 9, is arranged adjacent to the upper and lower series of shutters in each wing. Worm gears 41 on each shaft engage segment gears 42 on stub shafts 43 which carry the vanes. Sprocket gears 44 are fixed to the shafts 40 and over these sprocket gears and a sprocket gear 45 located in the pilot's cabin 46, sprocket chains 47 and 48 are trained. A crank handle 49 is operatively connected to the sprocket gear 45 and may be conveniently reached by the pilot to actuate the shafts 40 and open or close the vanes sufficiently to establish a predetermined amount of communication between the atmosphere and the interior of the forward passages.

By again referring to Figures 4 to 6 inclusive it will be seen that a plurality of louvres 50 are arranged in the upper and lower walls of the rear compartments in each wing. Air passing into these rear compartments will pass freely out of the open rear ends of the compartments and while entering the front ends of the compartments must impinge against the louvres 50. These louvres are all set at an angle of incidence so that the impinging air will exert lift and velocity to the wing. In this manner lifting power will be imparted to the wing structure without the use of conventional cambers which create a suction only on the top surfaces of conventional wings. In the construction illustrated lifting power is exerted not only on the upper surfaces but also on the lower surfaces of the wing so that consequently shorter narrower wings may be used to attain extreme speed with maximum stability in taking off and landing at low speeds.

By referring to Figures 7 and 13 it will be seen that the above referred to baffle walls 21 and 22 in the fuselage provide passage-ways 51 through which air is extruded or evacuated from the wings into the space between the inner wall 20 of the fuselage and the wind tunnel 11. Baffle plates 53 are disposed on the inner wall 20 to more uniformly distribute the suction created by the Venturi tube.

As shown by Figures 10, 11 and 12 each wing in addition to being divided into forward and rear compartments above and below the central diaphragm in the wing, is also provided above and below the diaphragm with division walls 54 and 55 which divide the wing structure into separate compartments extending from the tip of the wing to the juncture of the wing with the fuselage, these separate compartments being indicated by the reference numerals 56, 57 and 58 outside of the division walls 33 and 34. The corresponding compartments between the division walls 33 and 34 and the diaphragm 25 are indicated by the numerals 59, 60 and 61. This construction is shown in Figure 7 in addition to Figures 10 to 12 inclusive. The compartments outside of the division walls 33 and 34 communicate with the compartments between the division walls 33 and 34 and the diaphragm 25 through slots 62 in the division walls 33 and 34, these slots 62 being located between the baffle walls 35 and 36 which carry the vanes 39. Air drawn from the atmosphere through the vanes into the compartments 56, 57 and 58 will pass through the slots 62 into the compartments 59, 60 and 61 and from thence into the space between the inner wall 20 and the wind tunnel 11 in the fuselage, through an opening 63 formed in the outer wall of the fuselage, as best shown in Figure 13. Such air as above explained will be sucked rearwardly by the velocity of the air stream in the wind tunnel and ejected through the rear open end of the fuselage.

By extending the louvres 50 to the extreme rear edges of the bottom surfaces of the wings, greater speed may be obtained when dropping from a high altitude to a low altitude.

It is thought that from the above description the construction and operation of my invention will be fully understood without further explanation:

What is claimed is:

1. In an airplane, a tubular fuselage forming a Venturi tube, hollow wings, a diaphragm mounted substantially centrally in each wing to divide the wing into upper and lower compartments, division walls disposed obliquely to the diaphragm and merging with the diaphragm at the rear end, the division walls diverging forwardly to a point adjacent the leading edge of the wing and sub-dividing the upper and lower compartments into forward and rear compartments, and means establishing communication between the atmosphere and the fuselage through said forward compartment whereby banked-up air at the leading edge of the wing is withdrawn through the wing by the Venturi tube effect of the fuselage.

2. In an airplane, a tubular fuselage forming a Venturi tube, hollow wings, a diaphragm mounted substantially centrally in each wing to divide the wing into upper and lower compartments, division walls disposed obliquely at the diaphragm and merging with the diaphragm at the rear end, the division walls diverging forwardly to a point adjacent the leading edge of the wing, baffle walls disposed in spaced relation between the outer shell of the wing and the division walls to divide the wing into a forward compartment and a rear compartment above and below the diaphragm, and means establishing communication between the atmosphere, said forward compartment, and the fuselage whereby banked-up air is withdrawn from the leading edges of the wings by the Venturi tube effect of the fuselage.

3. In an airplane, a tubular fuselage forming a Venturi tube, hollow wings, a diaphragm mounted substantially centrally in each wing to divide the wing into upper and lower compartments, division walls disposed obliquely to the diaphragm and merging with the diaphragm at the rear end, the division walls diverging forwardly to a point adjacent the leading edge of the wing, baffle walls disposed in spaced relation between the outer shell of the wing and the division walls to divide the wing into a forward compartment and a rear compartment above and below the diaphragm, and adjustable shutters in the spaces between the baffle walls permitting communication between the atmosphere and said forward compartments whereby banked-up air is withdrawn from the leading edges of the wings by the Venturi tube effect of the fuselage.

ALBERT SCHRAMM.